3,533,727
POLYPROPYLENE DYEING WITH A TURPENTINE EMULSION AND SOLVENT SOLUBLE DYE

John J. Grunwald, New Haven, and William P. Innes, Cheshire, Conn., assignors to MacDermid Incorporated, Waterbury, Conn., a corporation of Connecticut
No Drawing. Filed Dec. 8, 1967, Ser. No. 688,970
Int. Cl. D06p *15/00*
U.S. Cl. 8—166                                        2 Claims

ABSTRACT OF THE DISCLOSURE

Molded and filamented plastic polymers, such as polypropylene, are dyed by immersing the plastic in a hot, aqueous microemulsion of the oil-in-water type containing, for example, linseed oil or turpentine, a soluble dye and water.

---

This invention relates generally to the dyeing of molded plastic and more particularly, polypropylene plastic. It also realtes to the coloring of polypropylene fiber by dyeing.

While some commercial coloring or dyeing of molded plastics is practiced today, the procedures involved are quite specialized and require special treatments which are not ordinarily suited for use in a plastic fabricating shop. In like manner, these methods are not suited for use in the coloring of plastic fibers. In the more conventional manner of coloring plastics, a pigment is incorporated in the powered or granular polymer material prior to molding. There are many times, however, where it is necessary or more convenient to apply the coloring to the finished molded plastic article, yet be able to do this without encountering the highly specialized procedures mentioned above. The coloring of polypropylene, which because of its lower cost and many desirable physical properties is finding ever increasing applications, is especially difficult to accomplish after molding.

A major purpose of the present invention, therefore, is to provide a relatively simple and effective way for coloring molded plastic and plastic fibers, and more particularly polypropylene plastic. Techniques and compositions are accordingly herein disclosed for use in treating the surface of molded plastic articles and for treating plastic fiber to permit such coloring of the plastic to be effected in a simple, economical manner.

Since finished or molded plastic articles frequently have residual internal stresses as the result of the molding operation, severe distortion of the articles can occur if they are subjected to temperatures where softening to the point of incipient plastic flow is encountered and warping can occur. An important aspect of the present invention accordingly is to provide compositions and procedures for effecting coloring of the surface of plastic materials at temperatures which are well below critical plastic flow temperatures of the material.

The processing temperature is also of importance in the coloring of plastic fiber, since high temperatures can cause distortion of the thin fiber. It is a further main aspect of the present invention that the compositions and procedures involved are effective for dyeing plastic fiber at temperatures well below those which would damage the quality of the plastic fiber being colored.

It has been discovered by the present inventors, and it is the basic concept of the invention herein disclosed, that dyeing of molded plastic articles, as well as dyeing of plastic fiber, can be accomplished by a treatment of the plastic with certain dyeing or coloration promoters incorporating a dye, both the dye and promoter being dispersed in aqueous solution and comprising a finely dispersed, stable, continuous (i.e., apparent single phase) micro-emulsion of the oil-in-water type. Various materials have been found to be effective as dyeing promoters but in general those giving the best results are lower molecular weight complex alcohols and ethers of the surfactant type, used alone or in combination with naturally occurring resinous products such as linseed, tall, tung and castor oils, turpentine and similar wood rosins. The dyes useful are of wide variety. The procedure here disclosed results in a greatly simplified coloring process in comparison to those processes heretofore employed.

The novel procedure involves subjecting the surface of the molded plastic part or fiber to the aqueous dye-promoter emulsion of the type mentioned above at a temperature and for a time determined by the intensity of color desired and certain other factors discussed hereinafter. Plastic immersed in such dye-containing solution absorbs the color, and the color penetrates appreciable distances into the body of the plastic itself.

Molded polypropylene parts and polypropylene fiber are readily dyed for example in a uniform manner in accordance with the present invention by immersing them for any length of time from 10 minutes to 2 hours in a hot but preferably nonboiling aqueous emulsion of turpentine containing an oil soluble dye. Increasing the time of immersion will result in increasing the color intensity of the dyed plastic. In a similar manner, increased temperature yields increased color intensity. The amount of turpentine can be varied to suit particular needs so long as it remains in the form of a fine dispersed emulsion with water. Although the system may be operative even for a water-in-oil type emulsion, or even in a single phase consisting of turpentine or other dyeing promoter alone, the activity of that type of system is sharply reduced so that much higher operating temperatures, about 220° F., are required. These higher temperatures generally create warping of molded parts due to release of internal strains, resulting in destruction of the part. For the foregoing reason, the present invention is directed to oil-in-water emulsions of the dyeing promoters. A particularly good system is illustrated by the following example.

EXAMPLE 1

An effective system is obtained by incorporation of about 4% by volume of turpentine, about 6% by volume of suitable surfactant as hereinafter defined, the balance being water apart from the dye which is incorporated in the turpentine in any amount up to the limit of its solubility therein. The dye may be organic or inorganic although the former are preferred. For red coloration, a particularly suitable dye is Sudan Red BBA (C. I. 26105). A surfactant combination that has been found especially suitable consists of 5% by volume (based on the total emulsion) of "Triton X–100" isooctylphenolethylene oxide condensation product in which 9 to 10 moles of ethylene oxide are reacted with the phenol and 1% by volume (total emulsion) of Benax 2A1 (trade name for sodium dodecyl diphenyl ether disulfonate). The latter serves primarily to prevent clouding of the emulsion at operating temperatures. Other surfactants which have been substituted for the "Triton X–100" with equal success are "Igepal CO–530," "Igepal CO–610," "Igepal CO–630" and "Igepal CO–850." These Igepal surfactants are disclosed in "Igepal Surfactant, Antara Chemicals," published 1963 by the General Aniline and Film Corporation, New York, N.Y. as being nonylphenol reacted with 6,9,9,10 and 20 moles of ethyleneoxide, respectively. This gives a range of 6 to 20 moles of ethyleneoxide reacted with nonylphenol to form non-ionic surfactants. These surfactants are also used at 5% by volume (based on the total emulsion).

An emulsion of the foregoing type is effective in the treatment of polypropylene at temperatures from 150°

F. to 200° F. for immersion times for 10 minutes to 2 hours as indicated above. Lower temperatures may be used but immersion times must be increased. The upper limiting temperatures are determined primarily by the nature of the plastic being treated and should be well below those at which incipient plastic flow can readily occur. Polypropylene shows no adverse effect after subjection to the treatment solution for the times and at the temperatures indicated above.

Preparation of the foregoing conditioning emulsion is best accomplished by first admixing the turpentine and surfactants. This combination is then heated to 130° F. and the dye is added to saturation, being extremely careful that all the dye is dissolved. This solution is then added to the appropriate volume of water with stirring. The water should be at the same temperature as that of the admixture of promoter or promoters and dye. The emulsion system can then be heated to a temperature suitable for dyeing.

While turpentine offers certain advantages as dyeing promoter because of its low cost and lower operating temperatures, other agents of the same class may be substituted in this system. It appears that a wide variety of the naturally occurring resins, including wood rosins other than turpentine, as well as linseed, tall, tung and castor oils are useful.

A second general type of dyeing promoter system within the invention involves the use of a sulfonated polyglycol hydrocarbon of lower molecular weight as the sole coloration promoting agent when used in combination with a dye. Again the dye and coloration promoting agent are incorporated in a stable microemulsion in which water is by far the predominating phase. An example of the type of promoting agent useful herein available commercially under the trade name "Polycomplex G" sold by Guardian Chemical Co. Plastic immersed in such a dye-containing solution absorbs the color quickly, and the color penetrates appreciable distances into the plastic itself. A particularly effective system is described in Example 2.

EXAMPLE 2

This system is produced by incorporating 5% by volume "Polycomplex G" with water. The "Polycomplex G" is first saturated with a suitable dye soluble therein, such as Sudan Red BBA. An aqueous coloring solution immediately ready for dyeing operations is thereby obtained. This system is effective in the treatment of polypropylene at temperatures from 150° F. to 220° F. and for immersion times from 10 minutes to 2 hours. A particularly intense red color is obtained by immersion of polypropylene parts and fibres at 200° F. for one hour.

Preparation of the foregoing coloring emulsion system is best accomplished in two steps in accordance with the following procedure:

STEP A

An appropriate amount (e.g. 50 ml. for a 5% by volume composition) of "Polycomplex G" is heated to about 130° to 140° F. A soluble dye that is compatible with the "Polycomplex G" is then added to saturation with constant stirring. When the dye is fully dissolved, a volume of water equal to about one-tenth the volume of "Polycomplex G" used (e.g. 5 ml.) is stirred into hydrate the dye-complex.

STEP B

The appropriate volume of water to make up the desired concentration (e.g. 945 ml. to make up one liter of a 5% by volume "Polycomplex G" bath) is heated to about 130° to 140° F. Then the solution from Step A is poured into the prescribed volume of heated water, resulting in a composition immediately useful for dyeing polypropylene.

The degree of coloration produced in the plastic is directly proportional to temperature for a given time of treatment. In the system of Example 2, using an immersion time of 1 hour, the following results are obtained:

160° F.—good red color
180° F.—good red, increased intensity
200° F.—slightly deeper red color
220° F.—same coloration as at 200° F.

At higher temperatures, boiling of the solution occurs which renders such operation less attractive economically. Attempts to raise the boiling point by addition of sodium chloride for example causes a clouding and interference with the coloring action. Pressurizing of the solution may be useful in allowing operation at higher temperatures to shorten the time of immersion needed for a given color intensity, but distortion of molded plastic parts then becomes a significant factor. A treatment temperature of 190°–210° F. appears optimum under normal atmospheric conditions for several reasons, therefore.

The time of immersion of the plastic in the coloring solution is also an important factor, of course. This is illustrated again in reference to Example 2 in which a solution identical with that was maintained at uniform temperature (195°–210° F.) and the immersion times of clear polypropylene plastic samples were varied as follows:

15 minutes—light red uniform coloration
30 minutes—deep red, good intensity
60 minutes—deeper red, maximum coloration
90 minutes—no change in color intensity About one hour immersion time thus gives the maximum coloration.

Dye concentration in all of the cases above discussed was at the limit of solubility in the coloration promoting agent. Obviously lower concentrations will diminish the coloring effect under corresponding temperature-time conditions.

The coloring effect is also influenced by the concentration of the dye promoting agent. In the case of "Polycomplex G" again using Sudan Red BBA to saturation, the color imparted to polypropylene samples immersed for 1 hour at 190°–200° F. at different promoter concentrations showed the following results:

1% (10 ml./l.)—light pink
2.5% (25 ml./l.)—good red of satisfactory intensity
5% (50 ml./l.)—as per Example 2; deep red
10% (100 ml./l.)—no improvement over 5%

Variation of both time and concentration at uniform solution temperature (200° F.), again using "Polycomplex G" and Sudan Red BBA, shows the following:

(a) 1% (10 ml./l.) promoting agent, 3 hours immersion time—Light red color imparted to plastic, resulting solution nearly clear, indicating that nearly all of the available dye is absorbed by the plastic.

(b) 2.5% (25 ml./l.) promoting agent, 1 hour, 45 minutes—Deep red of satisfactory maximum intensity obtained in about 1½ hours.

(c) 5% (50 ml./l.) promoting agent, 1 hour—Deep red corresponding to best results in Example 2.

(d) 10% (100 ml./l.) promoting agent, 30 minutes—Deep red equivalent to (c) above.

The foregoing demonstrates that an equilibrium is achieved depending on dye and promoter concentrations, time of immersion and temperature.

Coloring of polypropylene and other plastics is accomplished in the foregoing manner with a wide variety of dye materials. The only apparent essential requirement of the dye is that it be soluble to some appreciable extent in the promoting agent. The following are examples of various dyes that have been tried in aqueous emulsion, per Example 2, containing 5% "Polycomplex G," with a 1 hour immersion time at 200°–210° F., the dye being present up to saturation in the promoting agent:

(a) Calco Oil Blue V—Deep blue coloration, some tendance to nonuniformity.

(b) Oil Red O (C.I. 26125)—Deep red with excellent appearance and color intensity.

(c) Oil Orange 2311—Deep orange, excellent appearance and intensity.

(d) Sudan Red BBA—Deep red, excellent intensity.

(e) Sudan Blue GA (C.I. 61525)—Medium blue (between light and navy) of excellent intensity.

(f) Helio Oil Red R Powder—Light purple.

(g) Sudan Green 4B (C.I. 61565)—Light blue-green.

(h) Sudan Yellow GRN (C.I. 21230)—Pale yellow green.

(i) Sudan Orange RA (C.I. 12055)—Deep bright yellow of excellent intensity.

It would appear that any of many dyes available, so long as they have some appreciable solubility in the promoting agent, are useful in the system disclosed herein.

Both of the foregoing compositions of Examples 1 and 2 are characterized by the fact that a deep penetration of dye into the plastic substrate is achieved. As a result, the colored articles and fiber retain their color to a large degree even when subjected to various solvents (inorganic and organic). Information concerning color fastness is polypropylene is supplied in Table I below for different leaching solvents. Tests are at room temperature and 100% concentration of leaching solvent unless otherwise noted.

TABLE I

| Solvent | Time of immersion hour | Color loss |
|---|---|---|
| Water | 1 | None. |
| Acetone | 1 | Do. |
| Chromic-sulfuric mixture | 1 | Do. |
| 25% sodium hydroxide | 1 | Do. |
| Turpentine | 1 | About 50% color leached out. |
| Trichloroethylene | 1 | Do. |

What is claimed is:

1. The method of the coloring molded shaped polypropylene articles and filaments of polypropylene which comprises immersing the polypropylene articles or filament in hot aqueous stable micro-emulsion of the water-in-oil type consisting of about 4% by volume of turpentine, about 6% by volume of the surfactant selected from the group consisting of (A) a mixture of sodium dodecyl diphenyl ether disulfonate and isooctylphenolethylene oxide condensate with 9 to 10 moles of ethylene oxide reacted with the phenol or (B) nonylphenolethylene oxide condensate with 6 to 20 moles of ethylene oxide condensed with the phenol, a solvent dye soluble in the turpentine in a concentration up to the limit of solubility of the dye therein and the balance being essentially water.

2. The method of claim 1 wherein in the said emulsion the surfactant is a mixture of isooctylphenol condensed with 9–10 moles of ethylene oxide, the sodium dodecyl phenyl and the solvent soluble dye is Sudan Red BBA.

References Cited

UNITED STATES PATENTS

| 2,131,098 | 9/1938 | Dreyfus. | |
| 2,893,970 | 7/1959 | Caldwell et al. | |
| 3,097,047 | 7/1963 | Weinstein et al. | 8—94 |
| 3,076,720 | 2/1963 | Rice et al. | |
| 3,273,498 | 9/1966 | Martin. | |
| 3,314,813 | 4/1967 | Maxion. | |

OTHER REFERENCES

Ellis: Printing Inks, pp. 32, 114, 118, 119, 157, 164, 350, 351, and 352, pub. 1940 by Reinhold Publishing Corp.

DONALD LEVY, Primary Examiner

U.S. Cl. X.R.

8—173, 180